(12) United States Patent
Salisbury et al.

(10) Patent No.: US 7,465,759 B1
(45) Date of Patent: Dec. 16, 2008

(54) INKJET INKS AND METHODS OF PRINTING WITH THE SAME

(75) Inventors: Brian Salisbury, Hanover, MA (US); Rick Elmer, Brookline, MO (US); Mark Barnett, Pembroke, MA (US)

(73) Assignee: Gem Gravure Company, Inc., West Hanover, MA (US)

(*) Notice: Subject to any disclaimer, the term of this patent is extended or adjusted under 35 U.S.C. 154(b) by 371 days.

(21) Appl. No.: 11/363,514

(22) Filed: Feb. 24, 2006

Related U.S. Application Data

(60) Provisional application No. 60/657,307, filed on Feb. 28, 2005.

(51) Int. Cl.
*C09D 11/00* (2006.01)

(52) U.S. Cl. .................... 523/160; 106/31.13

(58) Field of Classification Search ................ 523/160, 523/161; 106/31.01–31.97
See application file for complete search history.

(56) References Cited

U.S. PATENT DOCUMENTS

| | | | | |
|---|---|---|---|---|
| 4,256,492 A | * | 3/1981 | Matsumoto et al. ...... | 106/31.37 |
| 4,834,799 A | * | 5/1989 | Song .......................... | 524/236 |
| 4,865,924 A | * | 9/1989 | Saito et al. ............... | 428/839.4 |
| 4,892,775 A | * | 1/1990 | Song .......................... | 428/32.1 |
| 5,453,122 A | | 9/1995 | Lyon | |
| 5,624,483 A | * | 4/1997 | Fujioka .................... | 106/31.29 |
| 5,637,139 A | | 6/1997 | Morelos et al. | |
| 5,674,923 A | * | 10/1997 | Subbaraman et al. ....... | 523/160 |
| 6,048,471 A | * | 4/2000 | Henry ......................... | 252/364 |
| 6,306,943 B1 | * | 10/2001 | Henry ......................... | 524/270 |
| 6,412,937 B1 | * | 7/2002 | Kato et al. .................. | 347/100 |
| 6,444,019 B1 | * | 9/2002 | Zou et al. ................... | 106/31.4 |
| 6,663,702 B1 | * | 12/2003 | Day ........................... | 106/31.27 |
| 6,726,756 B1 | * | 4/2004 | Zou et al. ................. | 106/31.57 |
| 6,814,791 B2 | | 11/2004 | Moore et al. | |
| 6,908,240 B1 | * | 6/2005 | Johnson et al. ............. | 400/238 |
| 2002/0115781 A1 | | 8/2002 | Pourreau et al. | |

FOREIGN PATENT DOCUMENTS

| | | | |
|---|---|---|---|
| WO | WO 98/42774 | 10/1998 | |
| WO | WO 9920699 A1 | * | 4/1999 |

\* cited by examiner

*Primary Examiner*—David Wu
*Assistant Examiner*—Vu Nguyen
(74) *Attorney, Agent, or Firm*—Hamilton, Brook, Smith & Reynolds, P.C.

(57) ABSTRACT

Described herein are inkjet inks that are substantially free of volatile organic compounds, or have a relatively small amount of volatile organic compounds, that are considered to significantly contribute to the formation of ground level ozone. The inkjet inks include at least one resin selected from the group consisting of a vinyl chloride-vinyl acetate copolymer resin and a copolyester resin; at least one colorant; and a solvent mixture that includes acetone and at least one additional solvent selected from the group consisting of tertiary butyl acetate and parachlorobenzotrifluoride. Also described are methods of printing indicia with inkjet inks.

22 Claims, No Drawings

INKJET INKS AND METHODS OF PRINTING WITH THE SAME

RELATED APPLICATION

This application claims the benefit of U.S. Provisional Application No. 60/657,307 filed on Feb. 28, 2005, the entire teachings of which are incorporated herein by reference.

BACKGROUND OF THE INVENTION

Organic solvents, many of which are classified as volatile organic compounds (VOCs), are widely used in traditional inkjet inks. VOCs are compounds of carbon (excluding carbon monoxide, carbon dioxide, metallic carbides or carbonates, and ammonium carbonates) that form ozone through atmospheric photochemical reactions. Compounds of carbon (also known as organic compounds) have different levels of reactivity. That is, various organic compounds do not react at the same speed or contribute to ozone formation to disparate extents.

VOCs are believed to be hazardous to human health because they react with free radicals in the air and generate ozone. Pursuant to the Clean Air Act of 1990, the U.S. Environmental Protection Agency (EPA) has mandated significant changes relating to the use of VOCs in inkjet inks, including mandates to reduce or report the use of VOCs that significantly contribute to the formation of ground level ozone. Generally, the EPA determines whether a given organic compound significantly contributes to the formation of ground level ozone by comparing the reactivity of the given compound to the reactivity of ethane. A VOC is determined to have a "negligible" reactivity if it is proven to not participate in atmospheric photochemical reactions to a lesser extant than ethane.

Unfortunately, most of the organic solvents traditionally used in inkjet inks either do not have the desired properties needed in a coating application or contribute to the formation of ground level ozone to an undesirable extent. Examples of VOCs that have been employed in inkjet inks are methanol, ethanol, and methyl ethyl ketone. A need exists for inkjet inks that do not significantly contribute to the formation of ground level ozone.

SUMMARY OF THE INVENTION

This invention provides inkjet inks that do not significantly contribute to the formation of ground level ozone. Compared to most prior art inkjet inks, the inkjet inks of the present invention are devoid of, or contain reduced amounts of, VOCs that significantly contribute to the formation of ground level ozone. This invention also provides methods of printing indicia using the ink jet inks of the present invention.

In some embodiments, the present invention includes inkjet ink compositions that comprise at least one resin selected from the group consisting of a vinyl chloride-vinyl acetate copolymer resin and a copolyester resin; at least one colorant; and a solvent mixture that includes acetone and at least one additional solvent selected from the group consisting of tertiary butyl acetate and parachlorobenzotrifluoride.

In other embodiments, the present invention includes methods of applying indicia to a substrate comprising the step of electronically directing a stream of ink droplets to the substrate and forming at least one printed image on the substrate with the stream of ink droplets, thereby applying indicia to the substrate. The ink droplets are formed from an inkjet ink of the present invention and include at least one resin selected from the group consisting of a vinyl chloride-vinyl acetate copolymer resin and a copolyester resin; at least one colorant; and a solvent mixture that includes acetone and at least one additional solvent selected from the group consisting of tertiary butyl acetate and parachlorobenzotrifluoride.

This invention provides inkjet inks that are free of, or have reduced amounts of, VOCs that significantly contribute to the formation of ground level ozone. In this way, the inkjet inks are typically exempt from some governmental regulations relating to VOCs, thereby reducing the costs associated with the manufacture and use of the inkjet inks. The inks of this invention are especially useful for printing on plasticized insulation on wires and cables.

DETAILED DESCRIPTION OF THE INVENTION

A description of preferred embodiments of the invention follows. While this invention has been particularly shown and described with references to preferred embodiments thereof, it will be understood by those skilled in the art that various changes in form and details may be made therein without departing from the scope of the invention encompassed by the appended claims.

It has been discovered that, surprisingly, mixtures of acetone and tertiary butyl acetate and/or parachlorobenzotrifluoride are suitable solvents for use in inkjet inks that include at least one vinyl chloride-vinyl acetate copolymer or copolyester resin. This is favorable because acetone, tertiary butyl acetate, and parachlorobenzotrifluoride are not considered to significantly contribute to the formation of ground level ozone and are generally exempt from many governmental regulations that apply to VOCs that are considered to significantly contribute to the formation of ground level ozone.

This invention provides inkjet inks that are devoid of VOCs that significantly contribute to the formation of ground level ozone or inkjet inks in which a relatively small fraction of the ink's overall composition comprises VOCs that significantly contribute to the formation of ground level ozone. As used herein, "VOCs" that "significantly contribute to the formation of ground level ozone" are organic compounds that form ozone more readily than ethane under the same conditions.

One method of determining whether a given organic compound forms ozone more readily than ethane involves comparing the $k_{OH}$ value of the given organic compound to the $k_{OH}$ value of ethane. $k_{OH}$ values represent the molar rate constant for reactions between a compound and a hydroxyl radical. If the given organic compound has a smaller $k_{OH}$ value than ethane, the organic compound likely produces ozone less readily than ethane.

Another method of determining whether a given organic compound forms ozone more readily than ethane involves comparing the "Incremental Reactivity" (IR) metrics of a given compound and ethane. Briefly, this measure of reactivity takes into account all of the factors by which the given compound affects ozone formation, including the effect of the environment where the compound reacts. IR metrics measure the change in the amount of ozone produced when the amount of a given organic compound in an air pollution testing environment is varied, divided by the amount of VOC added or removed. To eliminate the dependence on the amount of the organic compound added, incremental reactivity is defined as the value of the limit as the amount of organic compound added approaches zero (i.e., the value of the derivative of ozone with respect to the to organic compounded added approaches zero). If a given organic compound has an IR metric that is smaller than ethane the organic compound likely produces ozone less readily than ethane.

In some embodiments of the present invention, the inkjet inks are devoid of organic compounds having $k_{OH}$ values higher than the $k_{OH}$ value of ethane or include a relatively small amount of organic compounds that have $k_{OH}$ values that are higher than the $k_{OH}$ value of ethane. In some embodiments of the present invention, about 5% or less of the weight of the composition of the inkjet inks is made up of organic compounds having $k_{OH}$ values that are higher than the $k_{OH}$ value of ethane under identical conditions. In preferred embodiments of the present invention, about 2% or less of the weight of the composition of the inkjet inks is made up of organic compounds having $k_{OH}$ values that are higher than the $k_{OH}$ value of ethane under identical conditions. In especially preferred embodiments of the present invention, about 0.1% or less of the weight of the composition of the inkjet inks is made up of organic compounds having $k_{OH}$ values that are higher than the $k_{OH}$ value of ethane under identical conditions.

In some embodiments of the present invention, the inkjet inks are devoid of organic compounds having IR metric values that are less than the IR metric values of ethane. In some embodiments of the present invention, about 5% or less of the weight of the composition of the inkjet inks is made up of organic compounds having IR metric values that are higher than the IR metric values of ethane under identical conditions. In preferred embodiments of the present invention, about 2% or less of the weight of the composition of the inkjet inks is made up of organic compounds having IR metric values that are higher than the IR metric values of ethane under identical conditions. In especially preferred embodiments of the present invention, about 0.1% or less of the weight of the composition of the inkjet inks is made up of organic compounds having IR metric values that are higher than the IR metric values of ethane under identical conditions.

The inkjet inks of the present invention comprise at least one vinyl chloride-vinyl acetate copolymer or copolyester resin, at least one colorant, and a solvent mixture that includes acetone and at least one additional solvent selected from the group consisting of tertiary butyl acetate and parachlorobenzotrifluoride. Optionally, the inkjet inks include one or more conductivity agents, one or more surfactants, one or more polymeric dispersants, and one or more dispersant synergist. The inks of the present invention are suitable for deposition onto a substrate (e.g., a substrate that includes a polymeric material, such as polyvinylchloride, nylon, polyethylene, or other polymeric materials commonly used to insulate electrical wire) using inkjet printing methods and devices.

In some embodiments, the liquid inkjet ink has a viscosity in the range of from about 1 to about 10 centipoise at about room temperature, preferably in the range of from about 2 to about 6 centipoise at about room temperature. In other embodiments, the liquid inkjet ink has a conductivity greater than about 400 microsiemens per centimeter, preferably in the range of from about 500 to about 2,000 microsiemens per centimeter. In other embodiments, the inkjet ink has a surface tension of between about 20 and about 40 dynes/cm$^2$. In still more embodiments, the liquid inkjet ink is substantially devoid of any solid particles having a diameter of more than about 10 micrometers. In yet more embodiments, the average particle size of any solid particles in the liquid inkjet ink is about 1 micrometer or less.

In a specific embodiment, the solvent mixture includes acetone in an amount in a range of between about 20 percent and about 93 percent by weight of the inkjet ink composition, and tertiary butyl acetate and/or parachlorobenzitrifluoride in an amount in a range of between about 0.1 percent and about 85 percent by weight of the inkjet ink composition; a colorant in an amount in a range of between about 1 percent and about 25 percent by weight of the inkjet ink composition; a vinyl chloride-vinyl acetate copolymer resin and/or a copolyester resin in an amount in a range of between about 1 percent and about 30 percent, preferably between about 5 percent and about 30 percent, by weight of the inkjet ink composition. In a more specific embodiment, the inkjet ink composition of the specific embodiment further includes a surfactant in an amount of about 5 percent or less by weight of the inkjet ink composition, a conductivity agent in an amount of about 5 percent or less by weight of the inkjet ink composition.

Solvent

The ink includes a solvent mixture of acetone and at least one additional solvent selected from the group consisting of tertiary butyl acetate and parachlorobenzotrifluoride. The solvent mixture dissolves some or all of the other components so that the resulting ink is a homogeneous liquid. Once the ink is applied to a substrate or article, the solvent provides the ink with an accelerated drying time.

In addition to acetone, tertiary butyl acetate, and/or parachlorobenzotrifluoride, the solvent mixture optionally contains additional solvent materials. For example, the mixture can include additional materials that are commonly employed as inkjet ink solvents. Examples of such additional solvent materials include, but are not limited to, organic alcohols and methyl ethyl ketone. However, these additional solvents are present in amounts sufficiently small enough so that the final inkjet ink composition does not contain a relatively large amount of VOCs that are considered to significantly contribute to the formation of ground level ozone. For example, in some embodiments, the additional solvent materials are included in amounts such that less than 5% of the final inkjet ink composition is formed of VOCs that are considered to significantly contribute to the formation of ground level ozone. In preferred embodiments, the additional solvent materials are included in amounts such that less than 2% of the final inkjet ink composition is formed of VOCs that are considered to significantly contribute to the formation of ground level ozone. In especially preferred embodiments, the additional solvent materials are included in amounts such that less than 0.1% of the final inkjet ink composition is formed of VOCs that are considered to significantly contribute to the formation of ground level ozone.

The exact amount of the solvent mixture included in the ink will vary with the demands of a given application. In some embodiments of the invention, the amount of acetone included in the composition is in the range of from about 20 to about 95 percent, such as from about 20 to about 93 percent or from about 20 to about 90 percent, by weight of the final ink formulation. In other embodiments, the amount of tertiary butyl acetate and/or parachlorobenzotrifluoride included in the composition is in the range of from about 0.1 to about 85 percent, such as from about 0.1 to about 35, or from about 1 to about 50 percent, by weight of the final inkjet ink formulation.

Resin

The ink includes at least one resin selected from the group consisting of a vinyl chloride-vinyl acetate copolymer resin and a copolyester resin. The thermoplastic resins generally improve the adhesion of the ink to a substrate (e.g., the polymer insulation of an electrical wire or cable) and impart the deposited ink with a resistance to lubricant pulling and low transference from plasticized cables or wires. Acceptable resins include vinyl chloride-vinyl acetate copolymers, hydroxyl-modified vinyl chloride-vinyl acetate copolymers, carboxyl-modified vinyl chloride-vinyl acetate copolymers, sulfonate-modified vinyl chloride-vinyl acetate copolymers, hydroxyl/carboxyl-modified vinyl chloride-vinyl acetate copolymers, and copolyesters.

Examples of suitable vinyl chloride-vinyl acetate copolymers include UCAR™ VYHD, UCAR™ VYHH, and UCAR™ VYNS-3, all available from The Dow Chemical Company, Midland, Mich. Additional examples of suitable vinyl chloride-vinyl acetate copolymers include VINNOL® E15/45, VINNOL® H14/36, VINNOL® H15/42, VINNOL® H15/50, VINNOL® Hi1/59, VINNOL® H40/43, VINNOL® H40/50, VINNOL® H40/55, and VINNOL® H40/60, all available from Wacker Polymer Systems GmbH & Company, München, Germany.

Examples of suitable hydroxyl-modified vinyl chloride-vinyl acetate copolymers include UCAR™ VROH, UCAR™ VAGH, UCAR™ VAGD, UCAR™ VYNC, and UCAR™ VYES, all available from The Dow Chemical Company, Midland, Mich. Additional examples of suitable vinyl chloride-vinyl acetate copolymers include VINNOL® E15/40A, VINNOL® E15/48A, and VINNOL® E22/48A, all available from Wacker Polymer Systems GmbH & Company, München, Germany.

Examples of suitable carboxyl-modified vinyl chloride-vinyl acetate copolymers include UCAR™ VMCH, UCAR™ VMCC, and UCAR™ VMCA, all available from The Dow Chemical Company, Midland, Mich. Additional examples of suitable vinyl chloride-vinyl acetate copolymers include VINNOL® E 15/45M and VINNOL® Hi 5/45M, all available from Wacker Polymer Systems GmbH & Company, München, Germany.

An example of a suitable hydroxyl/carboxyl-modified vinyl chloride-vinyl acetate copolymers includes UCAR-MAG™ 527, available from The Dow Chemical Company, Midland, Mich.

Examples of suitable sulfonate-modified vinyl chloride-vinyl acetate copolymers include UCARMAG™ 569, available from The Dow Chemical Company, Midland, Mich.

Examples of suitable copolyesters include VITEL® 5833, VITEL® 5833B, and VITEL® 2700, all available from Bostik, Incorporated, Middleton, Mass.

The exact amount or type of resin(s) included in the ink will vary with the needs of a given application. Examples of suitable amounts of resin(s) include from about 1 percent by weight of the final ink formulation to about 30 percent by weight of the final ink formulation. In other examples, suitable amounts of resin(s) include from about 5 percent by weight of the final ink formulation to about 30 percent by weight of the final ink formulation. The resins and resin combinations should be chosen to provide the inkjet ink with acceptable film properties for a desired application. For example, in some applications that include printing on wire and cable polymeric insulation jacket materials, the resins and resin combinations can be chosen so that the final inkjet ink has acceptable adhesion and toughness properties when applied to the jacket materials as well as resistance to plasticizer migration and the pulling lubricants. Additionally, in some embodiments of the invention, the resins and resin combinations are chose to impart the final inkjet ink with a room temperature viscosity in the range of between about 1 and about 10 centipoise.

In some embodiments of the invention, the inkjet inks include a polyketone resin. Examples of suitable polyketone resins include Krumbhaar® K1717, Krumbhaar® K1717B, and Krumbhaar® K1717HMP, all available from Lawter International, Inc. of Pleasant Prairie, Wis.

Colorants

At least one colorant is included in the inkjet inks. Suitable colorants include dyes and pigments that are stable when exposed to light, heat, and water, have a low transferance when applied to plasticized cable or wire, and provide indicia with an acceptable contrast to a plasticized cable and wire substrate.

Colorants are commercially available from various sources, including Orient Corporation of America of Springfield, N.J.; Ciba Specialty Chemicals Inc. of Basel, Switzerland, and BASF Corporation of Florham Park, N.J. Specific examples of suitable dyes for use as a colorant in the inkjet inks include solvent black 27, solvent black 29, solvent black 34, and solvent black 45. Specific examples of suitable pigments for use as a colorant in the inkjet inks include carbon black, titanium dioxide, pigment yellow 139, pigment red 254, pigment blue 15:3, pigment blue 60, pigment green 7, pigment violet 37, pigment yellow 74, pigment yellow 83, pigment red 202, and pigment orange 64. Preferably, the colorant is one that is suitable for printing on plasticized wire and cable.

The exact type or amount of first colorant included in the ink will vary with the needs of a given application. Examples of suitable amounts of first colorant include from about 1 percent by weight of the final ink formulation to about 25 percent, such as from about 1 percent by weight of the final ink formulation to about 10 percent, or from about 1 percent by weight of the final ink formulation to about 20 percent, by weight of the final ink formulation.

Conductivity Agents

Optionally, the inkjet inks include at least one conductivity agents (e.g., a salt) to impart sufficient conductivity in the ink so as to allow for the use of the ink in a continuous inkjet machine. Examples of suitable conductivity agents include tetrabutyl ammonium nitrate, tetrabutyl ammonium hexafluorophosphate, potassium thiocyanate, and other conductivity agents known in the art. In some embodiments of the invention, one or more of the colorants act as a conductivity agent for the inkjet inks.

The exact amount or type of conductivity agent(s) included in the ink will vary with the needs of a given application. Examples of suitable amounts of conductivity agent(s) included in the final ink formulation include the amount of up to about 5 percent by weight of the final ink formulation.

Surfactant

One or more surfactants are optionally included in the ink to improve or assist in wetting a substrate to which the ink is applied. Since there are a wide variety of substrates and possible ink compositions, a wide variety of surfactants are suitable for use in this invention. Examples of suitable surfactants include fluorinated surfactants, such as Zonyl™ FSO (available from E. I. Du Pont de Nemours and Company, Wilmington, Del.) as well as those surfactants or wetting agents known in the art.

The exact amount or type of surfactants included in the ink will vary with the needs of a given application. In some embodiments of the invention, the amount and/or type of surfactants included in the ink is chosen so that the desired surface characteristics are imparted to the ink without introducing a significant amount of VOCs to the final inkjet ink composition. In some embodiments, the surfactants are included in amounts such that the VOC content of the final inkjet ink composition does not exceed 5 percent by weight of the composition. In preferred embodiments, the surfactants are included in amounts such that the total VOC content of the final inkjet ink composition does not exceed 2 percent by weight of the composition. In especially preferred embodiments, the surfactants are included in amounts such that the total VOC content of the final inkjet ink composition does not exceed 0.1 percent by weight of the composition.

Polymeric Dispersants and Dispersant Synergists

One or more polymeric dispersants are optionally included in the ink to stabilize the pigments. Additionally, one or more dispersant synergists are optionally included in the ink to aid in anchoring the dispersant to the pigment surface, to provide for higher millbase pigment loading through reduced viscosity, to improve rheology of the inkjet inks, to provide for better pigment stabilization, and/or to increase tinctorial properties of the inkjet ink or the inkjet ink components.

The exact amount or type of polymeric dispersants and dispersant synergists included in the ink will vary with the needs of a given application. Examples of suitable dispersants include the Solsperse™ line of dispersents available from Avecia, Inc. of Wilmington, Del. (e.g., Solsperse™ 5000, Solsperse™ 22000, and Solsperse™ 39000), the Disperbyk® brand of dispersents available from BYK-Chemie of Wesel, Germany, and Efka® brand of dispersents available from Efka Additives of Heerenveen, the Netherlands. In some embodiments, the amount of polymeric dispersant(s) included in the inkjet ink is 10 percent or less of the weight of the final inkjet ink. In further embodiments, the amount of dispersant synergist(s) included in the inkjet ink is about 5 percent or less of the weight of the final inkjet ink.

To form the ink, the various components are mixed together in the desired proportions. The order in which they are mixed is not critical, however, they are preferrably mixed in the following order: resin, conductivity agent, surfactant, and colorant.

If the colorant includes a pigment, it should first be made into a dispersion. The process for creating a dispersion is known in the art, and usually includes the following steps:
1. Dissolve the dispersant(s) and resin(s) into a solvent or solvent mixture;
2. Add the synergist (if used);
3. Add the pigment and mix the components until a uniform mixture is attained;
4. Mill the mixture until the desired particle size is reached. Milling equipment is commercially available from many sources such as, for example, Premier Mill of Reading, Pa.; Union Process Inc. of Akron, Ohio, Netzsch Fine Particle Technology, LLC of Exton, Pa., and Draiswerke, Inc. of Mahwah, N.J.
5. Resins, dispersants, synergists, and pigments should be chosen to give the desired colorant properties as well as adequate stability for the inkjet application of interest.

The various components of the ink should be selected in order to provide acceptable adhesion and indicia for a given application and the exact amounts and types of the various components will vary depending upon the needs of that application. Also, the components should be chemically compatible in the mixture so that all the components are able to dissolve and form a solution and/or form a fine enough suspension suitable for use in an inkjet application process. Optionally, the inkjet ink composition is filtered to remove those pigment particles that will obstruct an inkjet printhead. A 1 micrometer filter should suffice.

In some embodiments, the inkjet inks of the present invention comprise the formulations:

| Component | Wt. % of Inkjet Ink |
| --- | --- |
| Acetone | 20-93% |
| Parachlorobenzotrifluoride | 1-50% |
| Zonyl™ FSO | 0-5% |
| Tetrabutylammonium hexafluorophosphate | 0-5% |

-continued

| Component | Wt. % of Inkjet Ink |
| --- | --- |
| Vitel® 5833B | 5-30% |
| Solvent black 27 | 1-10% |

In other embodiments, the inkjet inks of the present invention comprise the formulations:

| Component | Wt. % of Inkjet Ink |
| --- | --- |
| Acetone | 20-92% |
| Tertiary butyl acetate | 0-50% |
| Zonyl™ ESO | 0-5% |
| Tetrabutylammonium hexafluorophosphate | 0-5% |
| UCAR™ VROH | 5-20% |
| Yellow dispersion | 1-50% |

Wherein the yellow dispersion comprises the following formulation:

| Component of Dispersion | Wt. % of Dispersion |
| --- | --- |
| Tertiary butyl acetate | 10-70% |
| UCAR™ VMCA | 0-40% |
| Solsperse™ 39000 | 1-20% |
| Solsperse™ 22000 | 0-10% |
| Pigment yellow | 1-40% |

In one embodiment, the inkjet inks of the present invention comprise the formulation:

| Component | Wt. % of Inkjet Ink |
| --- | --- |
| Acetone | 58% |
| Parachlorobenzotrifluoride | 15% |
| Zonyl™ FSO | 0.1% |
| Tetrabutylammonium hexafluorophosphate | 0.5% |
| Vitel® 5833B | 21.4% |
| Solvent black 27 | 5% |

In another embodiment, the inkjet inks of the present invention comprise the formulation:

| Component | Wt. % of Inkjet Ink |
| --- | --- |
| Acetone | 60% |
| Zonyl™ FSO | 0.1% |
| Tetrabutylammonium hexafluorophosphate | 0.9% |
| UCAR™ VROH | 9% |
| Yellow dispersion | 30% |

Wherein the yellow dispersion comprises the following formulation:

| Component of Dispersion | Wt. % of Dispersion |
| --- | --- |
| Tertiary butyl acetate | 54% |
| UCAR™ VMCA | 8.5% |
| Solsperse™ 39000 | 11% |

-continued

| Component of Dispersion | Wt. % of Dispersion |
|---|---|
| Solsperse ™ 22000 | 1.5% |
| Pigment yellow | 25% |

In other embodiments, this invention includes a method of applying indicia to a substrate using inkjet inks of the invention. The methods comprise the steps of electronically directing a stream of ink droplets to the substrate and forming at least one printed image on the substrate with the stream of ink droplets, thereby applying indicia to the substrate. The ink droplets include at least one resin selected from the group consisting of a vinyl chloride-vinyl acetate copolymer resin and a copolyester resin, at least one colorant, and a solvent mixture that includes acetone and at least one additional solvent selected from the group consisting of tertiary butyl acetate and parachlorobenzotrifluoride. Examples of suitable substrates include polymeric materials, such as the polymeric insulation of flexible wires.

EQUIVALENTS

While this invention has been particularly shown and described with references to preferred embodiments thereof, it will be understood by those skilled in the art that various changes in form and details may be made therein without departing from the scope of the invention encompassed by the appended claims.

What is claimed is:

1. An inkjet ink composition, comprising:
    a) at least one resin selected from the group consisting of a vinyl chloride-vinyl acetate copolymer resin and a copolyester resin;
    b) at least one colorant; and
    c) a solvent mixture that includes acetone and at least one additional solvent selected from the group consisting of tertiary butyl acetate and parachlorobenzotrifluoride.

2. The inkjet ink composition of claim 1, wherein the vinyl chloride-vinyl acetate copolymer resin is selected from the group consisting of a hydroxyl-modified vinyl chloride-vinyl acetate copolymer, a carboxyl-modified vinyl chloride-vinyl acetate copolymer, a sulfonate-modified vinyl chloride-vinyl acetate copolymer, and a hydroxyl/carboxyl-modified vinyl chloride-vinyl acetate copolymer.

3. The inkjet ink composition of claim 1, further including a polyketone resin.

4. The inkjet ink composition of claim 1, wherein about 5 percent or less of the weight of the inkjet composition is made of materials having a $k_{OH}$ value that is higher than the $k_{OH}$ value of ethane.

5. The inkjet ink composition of claim 1, wherein about 5 percent or less of the weight of the inkjet composition is made of materials having an IR metric that is higher than the IR metric of ethane when measured under the same testing conditions.

6. The inkjet ink composition of claim 1, wherein about 0.1 percent or less of the weight of the inkjet composition is made of a solvent other than acetone, tertiary butyl acetate, and parachlorobenzotrifluoride.

7. The inkjet ink composition of claim 1, further including at least one conductivity agent.

8. The inkjet ink composition of claim 1, further including at least one surfactant.

9. The inkjet ink composition of claim 1, further including at least one polymeric dispersant.

10. The ink jet ink composition of claim 9, further including at least one polymeric dispersant synergist.

11. The ink jet ink composition of claim 1, wherein the ink jet ink composition has a viscosity of between about 1 to 10 centipoise at 25° C.

12. The ink jet ink composition of claim 1, wherein the ink jet ink composition has a conductivity of greater than 400 microsiemens per centimeter.

13. The ink jet ink composition of claim 1, wherein the ink jet ink composition has a surface tension of between about 20 and 40 dynes/cm$^2$.

14. The inkjet ink composition of claim 1, wherein a portion of the colorant of the ink composition is in particulate form and has an average particle size of less than 1 micrometer.

15. The inkjet ink composition of claim 1, wherein:
    a) the amount of acetone in the inkjet ink composition is in a range of between about 20 percent and about 93 percent by weight of the inkjet ink composition;
    b) the amount of colorant in the inkjet ink composition is in a range of between about 1 percent and about 25 percent by weight of the inkjet ink composition;
    c) the amount of the additional solvent is in a range of between about 0.1 percent and about 85 percent by weight of the inkjet ink composition;
    d) the amount of the resin is in a range of between about 1 percent and about 30 percent by weight of the inkjet ink composition; and wherein the inkjet ink further includes a surfactant in an amount of about 5 percent or less by weight of the inkjet ink composition, a conductivity agent in an amount of about 5 percent or less by weight of the inkjet ink composition.

16. A method of applying indicia to a substrate, comprising the steps of:
    a) electronically directing a stream of ink droplets to the substrate, wherein said ink droplets include,
        i) at least one resin selected from the group consisting of a vinyl chloride-vinyl acetate copolymer resin and a copolyester resin;
        ii) at least one colorant; and
        iii) a solvent mixture that includes acetone and at least one additional solvent selected from the group consisting of tertiary butyl acetate and parachlorobenzotrifluoride; and
    b) forming at least one printed image on the substrate with the stream of ink droplets, thereby applying indicia to the substrate.

17. The method of claim 16, wherein the vinyl chloride-vinyl acetate copolymer resin is selected from the group consisting of a hydroxyl-modified vinyl chloride-vinyl acetate copolymer, a carboxyl-modified vinyl chloride-vinyl acetate copolymer, a sulfonate-modified vinyl chloride-vinyl acetate copolymer, and a hydroxyl/carboxyl-modified vinyl chloride-vinyl acetate copolymers.

18. The method of claim 16, wherein the ink composition further includes a polyketone resin.

19. The inkjet ink composition of claim 16, wherein about 5 percent or less of the weight of the inkjet composition is made of materials having a $k_{OH}$ value that is higher than the $k_{OH}$ value of ethane.

20. The inkjet ink composition of claim 16, wherein about 5 percent or less of the weight of the inkjet composition is made of materials having an IR metric that is higher than the IR metric of ethane when measured under the same testing conditions.

21. The method of claim 16, wherein about 0.1 percent or less of weight of the inkjet composition is made of a solvent other than acetone, tertiary butyl acetate, and parachlorobenzotrifluoride.

22. The method of claim 16, wherein the substrate is a portion of a polymeric insulation of a flexible wire.

* * * * *